US011190519B2

(12) United States Patent
Grobelny et al.

(10) Patent No.: US 11,190,519 B2
(45) Date of Patent: Nov. 30, 2021

(54) DOCK ADMINISTRATION USING A TOKEN

(71) Applicant: Dell Products L. P., Round Rock, TX (US)

(72) Inventors: Nicholas D. Grobelny, Austin, TX (US); Joshua N. Alperin, Round Rock, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 16/205,817

(22) Filed: Nov. 30, 2018

(65) Prior Publication Data

US 2020/0177596 A1 Jun. 4, 2020

(51) Int. Cl.
*H04L 29/06* (2006.01)
*H04L 12/24* (2006.01)
*G06F 8/65* (2018.01)

(52) U.S. Cl.
CPC ........ *H04L 63/102* (2013.01); *H04L 41/0813* (2013.01); *H04L 63/0838* (2013.01); *H04L 63/101* (2013.01); *G06F 8/65* (2013.01)

(58) Field of Classification Search
CPC ............... H04L 63/102; H04L 41/0813; H04L 63/0838; H04L 63/101; G06F 8/65
USPC .......................................................... 726/9
See application file for complete search history.

(56) References Cited

U.S. PATENT DOCUMENTS

| | | | |
|---|---|---|---|
| 7,080,078 B1 * | 7/2006 | Slaughter | G06F 9/465 |
| 7,194,538 B1 | 3/2007 | Rabe et al. | |
| 9,077,756 B1 * | 7/2015 | FitzGerald | H04W 12/08 |
| 2008/0235144 A1 * | 9/2008 | Phillips | G06Q 20/327 |
| | | | 705/67 |
| 2011/0162035 A1 * | 6/2011 | King | H04L 41/0813 |
| | | | 726/1 |
| 2012/0265913 A1 | 10/2012 | Suumaki et al. | |
| 2014/0201415 A1 * | 7/2014 | Huang | G06F 13/4022 |
| | | | 710/303 |

(Continued)

OTHER PUBLICATIONS

Lee,Blockchain-based secure firmware update for embedded devices in an Internet of Things environment, 2016, Springer, pp. 1152-1167 (Year: 2016).*

(Continued)

*Primary Examiner* — Taghi T Arani
*Assistant Examiner* — Gregory A Lane
(74) *Attorney, Agent, or Firm* — Egan Enders & Huston LLP.

(57) ABSTRACT

In some examples, a software agent may request a token from a server. The request may include dock identifiers associated with one or more docks, credentials, and actions to be performed by the one or more docks. The server may determine, using an access control list, whether the credentials authorize the software agent to instruct the one or more docks to perform the actions. If the server determines that the software agent is authorized, then the server may send a token to the software agent. The software agent may send an action request to the one or more docks. The action request may include the token and the actions. Each dock that receives the request may attempt to validate the token. If the dock successfully validates the token, the dock may perform the actions and send a message to the software agent indicating a result of performing the actions.

16 Claims, 7 Drawing Sheets

(56) References Cited

U.S. PATENT DOCUMENTS

| | | | |
|---|---|---|---|
| 2015/0103696 A1* | 4/2015 | Roberts | H04L 63/101 370/254 |
| 2016/0081132 A1* | 3/2016 | Lee | H04W 76/10 370/338 |
| 2016/0173482 A1* | 6/2016 | Wan | H04W 12/06 726/7 |
| 2016/0232010 A1* | 8/2016 | Dicks | G06F 8/654 |
| 2018/0095500 A1* | 4/2018 | Cohn | H04W 12/04033 |
| 2019/0042503 A1* | 2/2019 | Montero | G06F 13/4282 |
| 2020/0143057 A1* | 5/2020 | Limonciello | G06F 13/4282 |

OTHER PUBLICATIONS

Eichen, "Smartphone Docking Stations and Strongly Converged VoIP Clients for Fixed-Mobile Convergence", 2012, IEEE, pp. 3140-3144 (Year: 2012).*
Wikipedia, Kerberos (protocol), Captured from Internet Nov. 21, 2018, 7 pgs.
Microsoft Docs, "Kerberos Authentication Overview", Oct. 2016, 3 pgs.
Rouse, "Kerberos", SearchSecurity.com, Aug. 2016, 2 pgs.

* cited by examiner

DOCK ADMINISTRATION USING A TOKEN

BACKGROUND OF THE INVENTION

Field of the Invention

This invention relates generally to a docking station ("dock") associated with a computing device and, more particularly to providing a mechanism to enable authorized personnel to modify a configuration of the dock while preventing unauthorized actors from modifying the configuration.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A docking station ("dock") enables a computing device, such as a laptop computer, to connect to the dock and enables the computing device to access a wide variety of ports that may not be available on the computing device or that may be limited in quantity on the computing device. For example, due to the small amount of room available for ports on a laptop, the laptop may only include a few ports, such as several universal serial bus (USB) ports. In contrast, the dock may have more ports and a wider variety of ports as compared to the laptop, such as, for example, a networking port (e.g., Ethernet®), a video port (e.g., Thunderbolt®, video graphics adapter (VGA), digital video interface (DVI), high definition multimedia interface (HDMI), or the like), multiple USB ports, a memory card (e.g., Secure Digital (SD), microSD, or the like), port, another type of port, or any combination thereof. By connecting one of the ports (e.g., USB) of the laptop to the dock, the laptop is capable of interfacing with many devices via the dock. For example, the dock may enable the laptop to be connected to two or more external display (e.g., monitor) devices, an external keyboard, an external mouse, an Ethernet® (or other type of networking) port, and the like. A dock thus enables the laptop to become a substitute for a desktop computer, without sacrificing the mobile functionality of the laptop.

Conventionally, a dock is only configurable from a host computing device (e.g., a laptop or the like) that is physically connected to the dock. The host computing device that is connected to the dock has full control of the dock, and can access any peripheral devices and network resources available to the dock, regardless of the type of user. Thus, for example, a bad actor can connect a device to the dock and modify the dock's firmware to add malicious code, e.g., to log keystrokes (e.g., to capture login credentials, such as a username and password), log data sent or received using the dock's ports, and the like.

In addition, in an Enterprise network, where multiple computers are administered by an Information Technology (IT) department, conventionally, docks cannot be managed remotely. For example, to modify the firmware of a dock or to configure one or more features of the dock, the IT department may either (1) instruct each user on the procedure to configure (or modify a firmware of) the dock or (2) the IT department may send an individual administrator to physically connect to each dock to configure (or modify a firmware of) each dock. The former is fraught with difficulties since a non-technical user can make a mistake and render the dock inoperable. The latter is expensive and time consuming.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may send, over a network, a dock identifier request to one or more docks and receive, over the network, a dock identifier response from each of the one or more docks. Each dock identifier response may include a dock identifier associated with a particular dock. The admin computing device may send, over the network, a token request to a server. The token request may include: (1) one or more dock identifiers associated with the one or more docks, (2) a set of credentials associated with the admin computing device, and (3) one or more actions to be performed by each of the one or more docks. The server may authenticate the set of credentials (e.g., administrative identifier, password, or both) associated with the admin computing device and determine, using an access control list, whether the set of credentials is authorized to instruct the one or more docks to perform the set of actions. The admin computing device may receive, over the network and from the server, a token response comprising a token. The admin computing device may send, over the network, an action request to the one or more docks. The action request may include the token and a set of actions to be performed by each of the one or more docks. Each particular dock may validate (or authenticate) the token before performing the set of actions. The set of actions may include at least one of: (i) enabling a particular port of a plurality of ports associated with the particular dock, (ii) disabling the particular port, (iii) modifying one or more parameters associated with the particular port, (iv) modifying a configuration of the particular dock, or (v) downloading and installing a firmware update to modify a firmware of the particular dock. The admin computing device may receive, over the network and from each of the one or more docks, a dock response indicating a result of performing the set of actions. Each dock response may include one or more logs generated by performing at least one action of the set of actions. For example, the one or more logs may include or an installation log (e.g., associated with installing a firmware update).

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
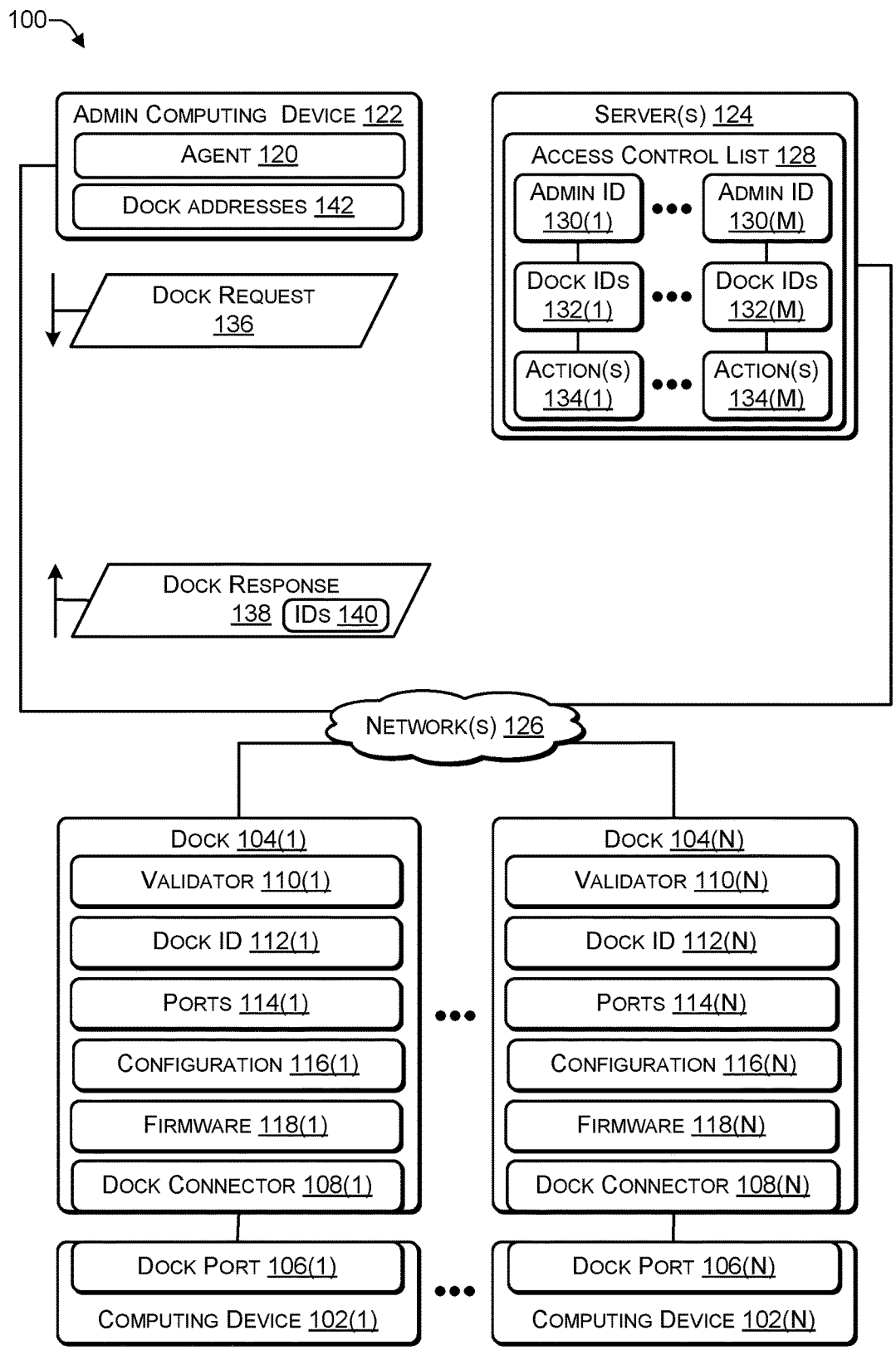
FIG. 1 is a block diagram of a system that includes an administrative device to request a dock identifier (ID) from one or more docks, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable centralized management, including configurating and updating of docking stations ("docks"). For example, when an IT administrator desires to configure or modify a firmware of one or more docks, the administrator (or an automated software process, such as an agent, executed by the administrator) may use an admin computing device (e.g., a computing device used by an IT professional) to request a dock identifier (ID) of the one or more docks. The administrator may determine a particular set (e.g., one or more) actions to perform to the one or more docks. The administrator may send a request for a token to a server. The request may include credentials (e.g., the administrator's credentials), a dock ID associated with each of the one or more docks, and the particular set of actions. The server may authenticate the credentials and use an access control list (ACL) or similar data structure to determine whether the administrator is authorized to perform the particular set of actions to one or more docks associated with the dock IDs in the request. If the server determines that the administrator is not authorized to perform the particular set of actions to the docks associated with the dock IDs, then the server may deny the request. If the server determines that the administrator is authorized to perform the particular set of actions to the one or more docks associated with the dock IDs, then the server may provide a token (or another type of authorization) to the administrator. The administrator may send a request to the one or more docks that includes the provided token and the particular set of actions.

Each of the one or more docks may receive the request and determine if the token is valid. In some cases, each dock may have a validation module that determines whether the token is valid. In other cases, each dock may communicate with the server to determine whether the token is valid. If a particular dock of the one or more docks determines that the token is valid, then the particular dock may perform the particular set of actions and send a response indicating a result of performing the particular set of actions (e.g., one or more logs generated as a result of performing the actions). For example, the actions may include enabling a particular port, disabling a particular port, configuring a particular port (e.g., setting one or more parameters associated with the particular port), downloading and installing a particular firmware version (e.g., a firmware update), another action, or any combination thereof. If the particular dock determines that the token is invalid, then the dock may not perform the particular set of actions and may send a response indicating that the actions were not performed because the token was invalid. In some cases, the dock may send a message to an administrator (e.g., the agent) indicating that an attempt was made to modify the dock using an invalid token. In this way, only those with the authority (e.g., a token) to perform a particular set of actions are provided authorization (e.g., the token) to instruct a dock to perform the actions. In addition, an IT administrator (or an automated process executing on an administrator's device) may remotely modify a configuration of one or more docks, including enabling a port, disabling a port, configuring a port (e.g., modifying one or more parameters associated with the port), downloading and installing a particular firmware version (e.g., a firmware update), another action, or any combination thereof. Thus, the systems and techniques described herein provide a secure system that prevents bad actors from modifying the configuration of each dock (e.g., by loading malicious firmware or the like) and enables remote administration and configuration of multiple docks substantially simultaneously. For example, a system administrator may create a script or other software process to automatically configuring (e.g., including updating the firmware of) multiple docks, without having to physically visit each dock, thereby saving time and effort.

As an example, an admin computing device may include (1) one or more processors and (2) one or more non-transitory computer readable media storing instructions executable by the one or more processors to perform various operations. For example, the operations may include a software agent executing on the admin computing device sending, over a network, a dock identifier request to a particular dock of a plurality of docks and receiving a dock identifier response from the particular dock. The dock identifier response may include a dock identifier associated with the particular dock. The operations may include sending, over the network, a token request to a server. The token request may include: (1) a dock identifier associated with a particular dock, (2) a set of credentials associated with the admin computing device, and (3) one or more actions to be performed by the dock. The server may authenticate the set of credentials (e.g., administrative identifier, password, or both) associated with the admin computing device and determine, using an access control list, whether the set of credentials is authorized to instruct the particular dock to perform the set of actions. The operations may include receiving, over the network and from the server, a token response comprising a token. The operations may include sending, over the network, an action request to a particular dock of a plurality of docks. The action request may include the token and a set of actions to be performed by the particular dock. In some cases, the action request may include the dock identifier associated with the particular dock. The dock may validate (or authenticate) the token before performing the set of actions. The set of actions may include at least one of: (i) enabling a particular port of a plurality of ports associated with the particular dock, (ii) disabling the particular port, (iii) modifying one or more parameters associated with the particular port, (iv) modifying a configuration of the particular dock, or (v) downloading and installing a firmware update to modify a firmware of the particular dock. The operations may include receiving, over the network and from the particular dock, a dock response indicating a result of performing the set of actions. The dock response may include one or more logs generated by performing at least one action of the set of actions. For example, the one or more logs may include or an installation log (e.g., associated with installing a firmware update).

A dock may include a plurality of ports and a logic device configured with instructions that are executable by the logic device to perform various operations. For example, the operations may include receiving, over a network and from an admin computing device, an action request comprising: (i) a token and (ii) a set of actions. In some cases, the action request may also include a dock identifier and the operations may include verifying that the dock identifier is associated with the dock (e.g., before performing the set of actions). The operations may include validating the token. In some cases, the logic device may execute validator instructions to validate the token while in other cases the dock may send a request to a server to validate the token. The operations may include performing the set of actions and sending, over the network, a dock response to the admin computing device indicating a result of performing the set of actions. The set of actions comprise at least one of: (i) enabling a particular port of a plurality of ports associated with the particular dock, (ii) disabling the particular port, (iii) modifying one or more parameters associated with the particular port, (iv) modifying a configuration of the particular dock, or (v) downloading and installing a firmware update to modify a firmware of the particular dock. In some cases, the dock response may include a log generated by performing a particular action of the set of actions, such as, for example, an installation log associated with installing a firmware update.

FIG. 1 is a block diagram of a system 100 that includes an administrative device to request a dock identifier (ID) from one or more docks, according to some embodiments. The system 100 includes multiple computing devices 102(1) to 102(N) (N>0) coupled to a corresponding one of docks 104(1) to 104(N). For example, the computing device 102(1) may be coupled to the dock 104(1) and the computing device 102(N) may be coupled to the dock 104(N). Each of the computing devices 102 may include a dock port 106 that connects to a corresponding dock connector 108 in each of the docks 104. For example, the dock port 106 and the dock connector 108 may use a proprietary connector (e.g., Dell® E-port or the like) or a standard connector (e.g., USB 3.0, USB Type C, or the like).

Each of the docks 104 may include a validator (module) 110, a dock identifier (ID) 112, one or more ports 114, a configuration 116, and a firmware 118. For example, the validator 110, the dock ID 112, and the configuration 116 may be included in the firmware 118. The validator 110 may validate credentials (e.g., a token) when the dock 104 is sent a request to perform one or more actions. For example, a particular one of the docks 104 may perform one or more actions sent in a request if the dock determines that the credentials are valid and not perform the actions if the dock determines that the credentials are invalid. The dock ID 112 may be an identifier that uniquely identifies a particular one of the docks 104 from the others of the docks 104. For example, the dock ID 112 may be a serial number, a service tag, a media access control (MAC) address, or another unique identifier. The ports 114 may include one or more of an Ethernet® port, a USB port, a video port (e.g., VGA, DVI, HDMI, or the like), a memory card port (e.g., for a compact flash (CF) card, a secure digital (SD) card, a microSD card, or the like), another type of port, or any combination thereof. In some cases, each of the docks 104 may have a networking interface to enable each of the docks 104 to communicate with other devices (e.g., 122, 124) across the network 126.

The configuration 116 may include a configuration of each of the ports 114, such as, for example, which of the ports 114 are enabled, which of the ports 114 are disabled, parameters associated with each port, and the like. For example, the configuration 116 may include which USB ports (of the ports 114) are configured to provide power to devices, a maximum throughput (e.g., maximum bitrate), error checking, a type of compatibility (e.g., USB 2.0, USB 2.1, USB 3.0, or the like) of the port, another port configuration parameter, or any combination thereof.

An admin computing device 122 and one or more servers 124 may be coupled to the docks 104 via a network 126. While a single server 124 is illustrated in FIG. 1, the servers 124 may include multiple servers. For example, each of the multiple servers 124 may perform a particular function, such as an authentication server, an access control list (ACL) server, a firmware hosting server, and the like.

The admin computing device 122 may be a computing device used by an IT administrator that has special privileges. The admin computing device 122 may include a software agent 120 to perform various tasks, including obtaining a token and instructing one or more of the docks 104 to perform one or more actions.

The servers 124 may include an access control list (ACL) 128 and one or more tokens 134. The ACL 128 may include a list (or other type of data structure) that identifies multiple administrator identifiers (admin ID) 130, a set of dock IDs 132 (e.g., a subset of the dock IDs 112) that the associated admin ID can instruct, and a set of actions 134 that the administrator ID 130 can instruct the set of dock IDs 132 to perform. For example, an administrator having the admin ID 130(M) may be capable of instructing docks corresponding to the set of (one or more) dock IDs 132(M) to perform the set of actions 134(M). To illustrate, admin ID 130(1) may be authorized to instruct the set of dock IDs 132 (e.g., a subset of the dock IDs 112(1) to 112(N)) to perform a particular set of actions 134(1), such as modifying the corresponding configurations 116. However, admin ID 130(1) may not be authorized to instruct the set of dock IDs 132 (e.g., a subset of the dock IDs 112(1) to 112(N)) to upgrade the firmware 118. In this way, some of the admin IDs 130 may be authorized to instructs portions of the docks 104 to perform some actions but not perform other actions. For example, a United States-based admin ID 130 may be authorized to instruct those docks 104 located in the United States but may not be authorized to instruct others of the docks 104, such as docks located in Asia, South America, and other regions outside the United States. An Asia-based admin ID 130 may be authorized to instruct those docks 104 located in Asia but not docks located outside Asia. Within the United States admin IDs 130, some of the admin IDs may be authorized to modify the configuration 116 but not modify the firmware 118 while others of the admin IDs may be authorized to modify the configuration 116 and modify the firmware 118. Thus, the ACL 128 may determine which of the admin IDs 130 are authorized to perform which particular set of the actions 134 to which particular set of the dock IDs 132.

The agent 120 may send a dock request 136, via the network 126, to one or more of the docks 104 requesting the doc ID 112 associated with each of the docks. For example, the agent 120 may send the dock request 136 to the dock 104(N) requesting the associated doc ID 112(N). The dock request 136 may be sent to an address associated with the particular dock based on the dock addresses 142. For example, the dock addresses 142 may include a dock address, such as an Internet Protocol (IP) or other type of address, associated with each of the docks 104. In response, the particular one of the docks 104 may send a dock response 138 that includes an ID 140 (e.g., one of the doc IDs 112), via the network 126, to the admin computing device 122. For example, the dock 104(N) may send the dock response 138 including the associated doc ID 112(N) to the admin computing device 122. In some cases, the agent 120 may send the dock request 136 (or multiple dock requests 136) substantially simultaneously to multiple ones of the docks 104 and receive multiple dock responses 138. For example, the agent 120 may send the dock request 136 to the docks 104(1) to 104(X), where 0<X<=N.

Thus, a software agent executing on an admin computing device may send a request to a set of (e.g., one or more) docks requesting a dock ID associated with each dock in the set of docks. The software agent may obtain the dock ID(s) prior to instructing the dock(s) to perform one or more actions, such as, for example, changing the configuration of the dock(s) (e.g., changing which ports are enables, changing which ports are disabled, changing parameters associated with one or more of the ports, updating the firmware, or the like).

Figure 2:
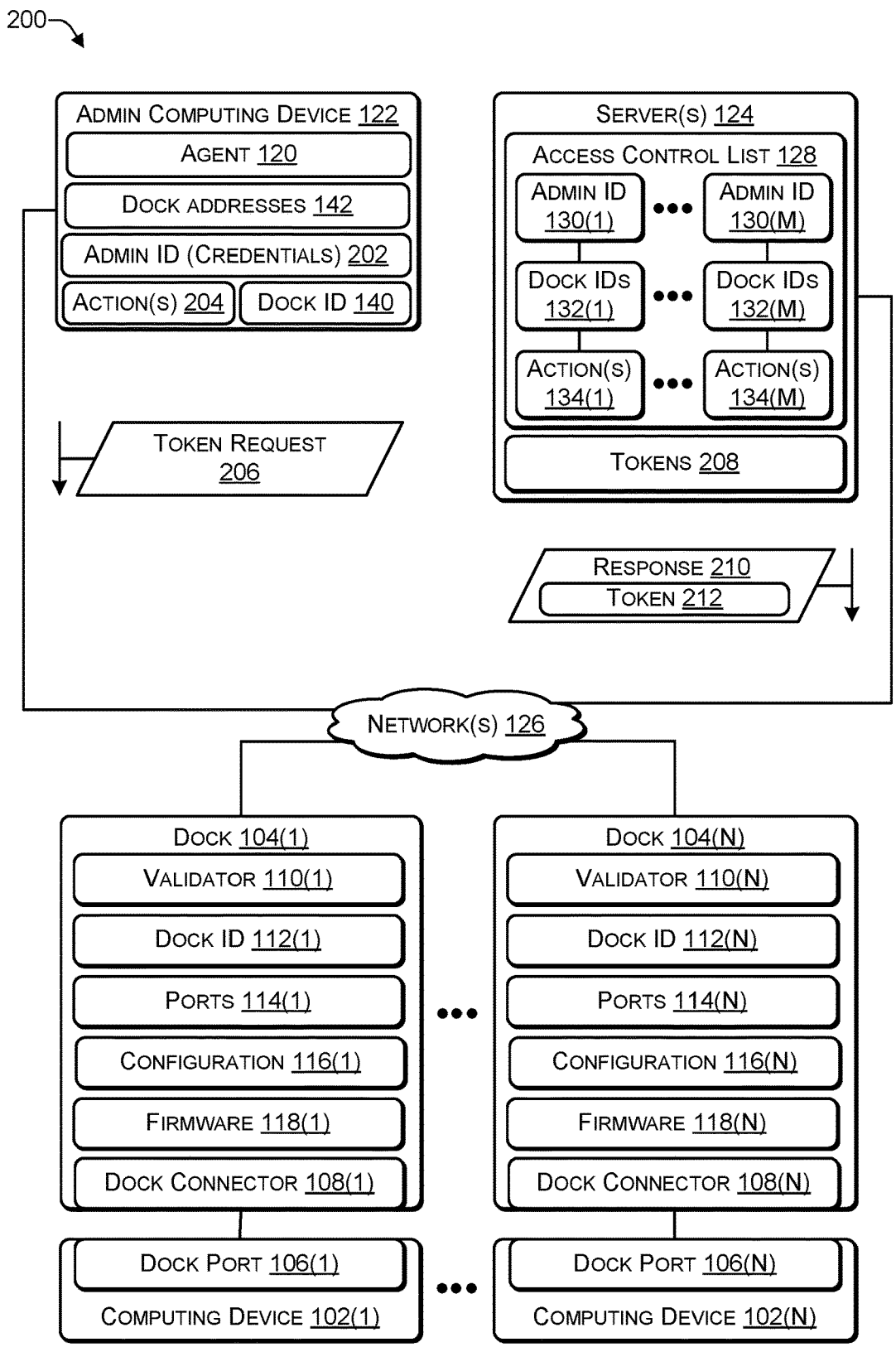
FIG. 2 is a block diagram of a system that includes an administrative device to request a token to enable the administrative device to remotely modify a dock, according to some embodiments.

FIG. 2 is a block diagram of a system 200 that includes an administrative device to request a token to enable the administrative device to remotely modify a dock, according to some embodiments. In the system 200, the administrative device 122 may include an administrative ID 202 (or another type of administrator credentials) associated with the agent 120, with the administrative device 122, or with an administrator that is using the administrative device 122. The agent 120 may determine one or more actions 204 that a particular one of the docks 104 is to perform. The particular one of the docks 104 may be associated with the dock ID 140 (e.g., that was obtained as described above in FIG. 1). The one or more actions 204 may include enabling one or more of the ports 114, disabling one or more of the ports 114, modifying one or more parameters associated with one or more of the ports 114, updating the firmware 118, another type of action, or any combination thereof.

The admin computing device 122 may send a token request 206, via the network 126, to the server 224. The token request 206 may include the admin ID 202, the dock ID 140, and the actions 204. The server 224 may receive the token request 206 and use the ACL 128 to determine if the admin ID 202 is authorized to instruct the dock ID 140 to perform the actions 204. In some cases, one of the servers 224 may authenticate the admin ID 202 (or other credentials) before checking the ACL 128 to determine whether the admin ID 202 is authorized to perform the actions 204 to one of the docks 104 associated with the dock ID 140. If the server 224 determines that the admin ID 202 is not authorized to instruct the dock ID 140 to perform the actions 204, then the server 224 may send a response 210 denying the request. If the server 224 determines that the admin ID 202 is authorized to instruct the dock ID 140 to perform the actions 204, then the server 224 may send the response 210 including a token 212 (e.g., one of a set of tokens 208 stored by the server 224. The token 212 may enable the admin computing device 122 to instruct a particular one of the docks 104 associated with the dock ID 140 to perform the actions 204.

In some cases, the token request 206 may include one or more of the dock IDs 140. For example, the agent 120 may instruct multiple docks 104 substantially simultaneously. In such cases, the token request 206 may include the dock ID 140 of each dock that the admin computing device 122 is to instruct. A single token, such as the token 212, may provide the admin computing device 122 with the authority to instruct multiple ones of the docks 104.

Thus, an admin computing device may send a request for a token to a server. The request may include (1) credentials, such as an admin ID, (2) a dock ID identifying a dock that the admin computing device is targeting, and (3) one or more actions that the dock will be asked to perform. The server may authenticate the credentials and use an access control list (or other data structure) to determine if admin ID is authorized to instruct the dock (associated with the dock ID) to perform the one or more actions. The server may deny the request for a token if the server is unable to authenticate the credentials (e.g., admin ID) or if the access control list (or other data structure) indicates that the admin ID is not authorized to instruct the dock (associated with the dock ID) to perform the one or more actions. The server may provide a token to the admin computing device if the server successfully authenticates the credentials (e.g., admin ID) and the access control list (or other data structure) indicates that the admin ID is authorized to instruct the dock (associated with the dock ID) to perform the one or more actions. The token may enable (e.g., authorize) the admin computing device to instruct a particular dock to perform one or more actions.

Figure 3:
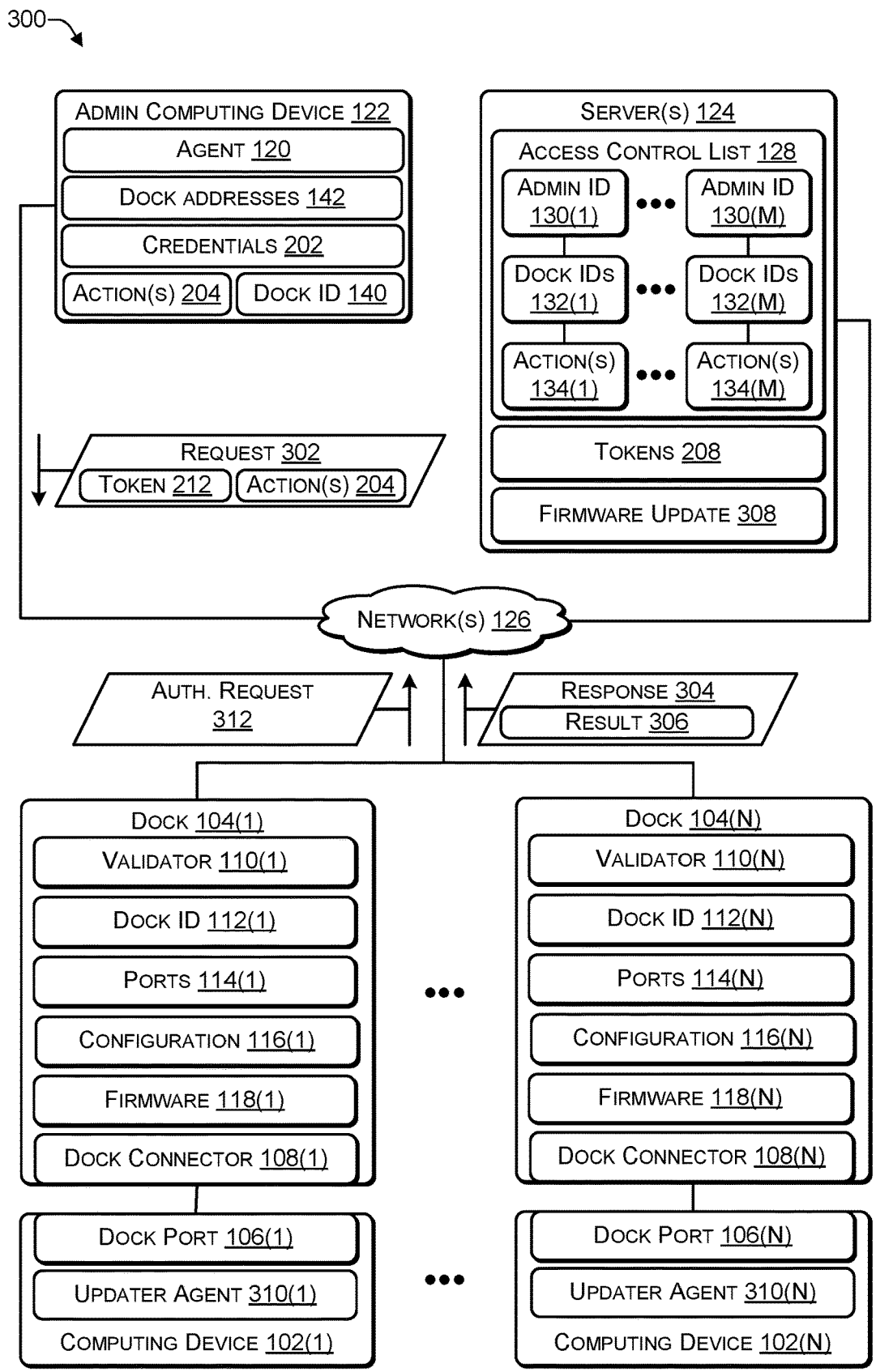
FIG. 3 is a block diagram of a system that includes an administrative device to send a request to remotely modify a dock, according to some embodiments.

FIG. 3 is a block diagram of a system 300 that includes an administrative device to send a request to remotely modify a dock, according to some embodiments. In the system 300, the admin computing device 122 may send a request 302 to a particular dock, such as the representative dock 104(N) (N>0). The request 302 may be sent to an address (e.g., from the dock addresses 142) associated with the dock 104(N). The request 302 may include the token 212 and the actions 204. In some cases, the request 302 may include the dock ID 140.

The representative dock 104(N) may receive the request 302. If the request 302 includes the dock ID 140, the dock 104(N) may compare the dock ID 140 to the dock ID 112(N) to determine whether the request 302 is intended for the dock 104(N). If the dock 104(N) determines that the request 302 is not intended for the dock 104(N), the dock 104(N) may send a response 304 denying the request 302 (e.g., without performing the actions 204). If the dock 104(N) determines that the request 302 is intended for the dock 104(N), the dock 104(N) may authenticate the token 212. For example, in some cases, the validator module 110(N) may validate (e.g., authenticate) the token 212 to confirm that the sender (e.g., the admin computing device 122) is authorized to instruct the dock 104(N) to perform the actions 204. In other cases, the dock 104(N) may send the token 212 to the servers 124 and request the servers 124 to validate (e.g., authenticate) the token 212.

If the dock 104(N) is unable to validate (e.g., authenticate) the token 212, then the dock 104(N) may send the response 304 denying the request 302 (e.g., without performing the actions 204). If the dock 104(N) is able to validate the token 212 (e.g., using the validator 110(N) or the servers 124), then the dock 104(N) may performing the actions 204 specified in the request 302. The actions 204 may include modifying the configuration 116. For example, the actions 204 may include enabling one of the ports 114, disabling one of the ports 114, modifying parameters associated with one of the ports 114, updating the firmware 118(N) of the dock 104(N), performing another modification to the dock 104(N), or any combination thereof. To illustrate, one of the actions 204 may instruct the dock 104(N) to download and install a firmware update 308 from one of the servers 124. For example, the firmware update 308 may modify the firmware 118(N) or replace the firmware 118(N) with a different firmware version. The firmware update 308 may perform one or more actions, such as, for example, upgrading the firmware 118(N) to a newer version, downgrading the firmware 118(N) to an older version, modifying (e.g., repairing) the firmware 118(N), or recovering the firmware 118(N).

After performing the actions 204, the dock 104(N) may send the response 304 indicating whether the actions 204 were successfully performed. For example, a result 306 may indicate whether all of the actions 204 were successfully performed. If one or more of the actions 204 were unsuccessful, then additional information, such as an error log, may be included in the result 306. For example, if the dock 104(N) was unsuccessful in installing the firmware update 308, an installation log associated with the firmware update 308 may be included in the result 306.

In some cases, the admin computing device 122 may send the request 302 to a particular set (e.g., one or more) of the docks 104. For example, the agent 120 may, substantially simultaneous, send the request 302 to the docks 104(1) to 104(X), where 0<X<=N, to instruct the docks 104(1) to 104(X) to each perform the actions 204. Each of the docks 104 that receive the request 302 may validate the token 212 and perform the actions 204 if the token 212 was successfully validated. In this way, the admin computing device 122 can instruct multiple ones of the docks 104 to perform the actions 204. Each of the docks 104 that receive the request 302 may attempt to validate the token 212. If the token is determined to be invalid, then the docks 104 may not perform the actions 204. If the docks 104 that receive the request 302 determine that the token 212 is valid, then each of the docks 104 may perform the actions 204 and may each send the response 304 indicating the result 306 of performing the actions 204.

In some cases, the admin computing device 122 may send the request 302, substantially simultaneously, to a set of (e.g., one or more) computing devices 104 without obtaining each of the corresponding dock IDs 112. A dock updater agent 310 executing on each of the computing devices 102 that received the request 302 may retrieve the corresponding dock ID 112. For example, the updater agent 310(1) on the computing device 102(1) may retrieve the dock ID 112(1) and the updater agent 310(N) on the computing device 102(N) may retrieve the dock ID 112(N). Each updater agent 310 may send an authorization 312 to the server 124. The authorization request 312 may include the token 212 and the actions 204 that were received in the request 302, and the corresponding dock ID 112 of the dock 104. The server 124 may use the ACL 128 to determine whether the admin computing device 122 is authorized to instruct the agents 310 to perform the actions 204 to the docks 104. If the updater agents 310 receive a message from the server 124 that the admin computing device 122 is authorized, then the updater agents 310 may perform the actions 204 to the corresponding docks 104. For example, the updater agent 310(N) may perform the actions 204 to the dock 104(N). If the updater agents 310 receive a message from the server 124 that the admin computing device 122 is not authorized, then the updater agents 310 may not perform the actions 204.

Thus, one or more docks may receive a request to perform one or more actions, such as modify a configuration of the ports of each dock or modify a firmware of each dock. Each dock may verify (e.g., authenticate) a token included in the request to verify that the request was sent by an authorized agent (e.g., and not sent by a bad actor). In this way, each dock verifies the authenticity of the request before performing any of the actions specified in the request. If each dock is able to verify the token, then each dock that receives the request may perform the requested actions and provide a response indicating whether the actions were successfully performed by each dock. In some cases, each response may include a log (e.g., error log, installation log, or the like) associated with performing one or more of the actions. If a dock is unable to verify the token, then the dock may not perform the requested actions. In such cases, the dock may provide a response indicating that the requested actions were not performed because the token could not be verified (e.g., authenticated). In addition, the dock may notify (e.g., send a message to) the admin computing device indicating that the request was received that included the unverifiable token. In this way, bad actors who do not have a valid token cannot modify the dock and cannot load malicious firmware onto the dock. An attempt by a bad actor to modify one or more of the docks may cause the docks to report the attempt to the admin computing device. In addition, the dock can be remotely configured over a network by a software agent executing on an admin computing device, e.g., without a user physically connecting to the dock using the dock connector, thereby enabling remote administration of multiple docks in a large Enterprise network.

Figure 4:
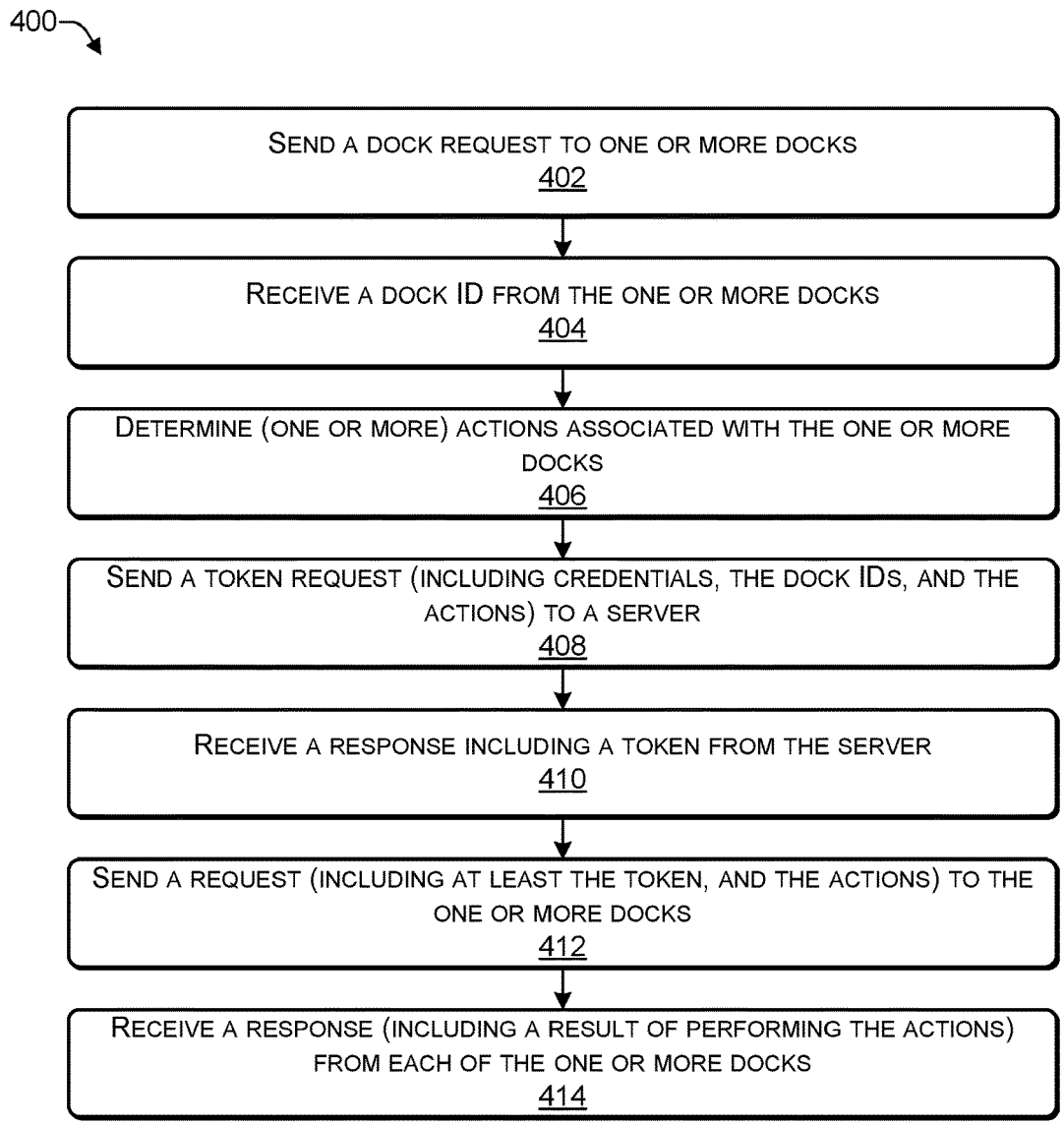
FIG. 4 is a flowchart of a process that includes receiving a token from a server, according to some embodiments.
Figure 5:
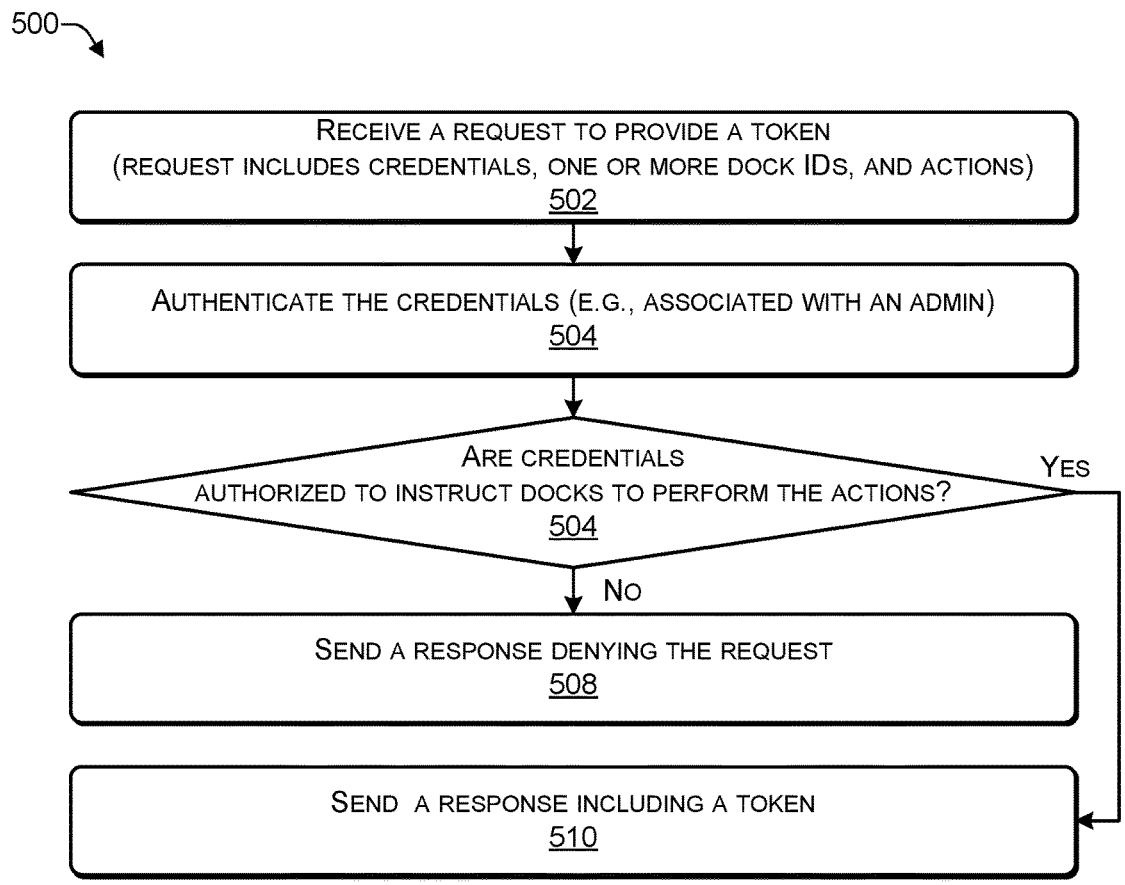
FIG. 5 is a flowchart of a process that includes providing a token after authenticating credentials, according to some embodiments.
Figure 6:
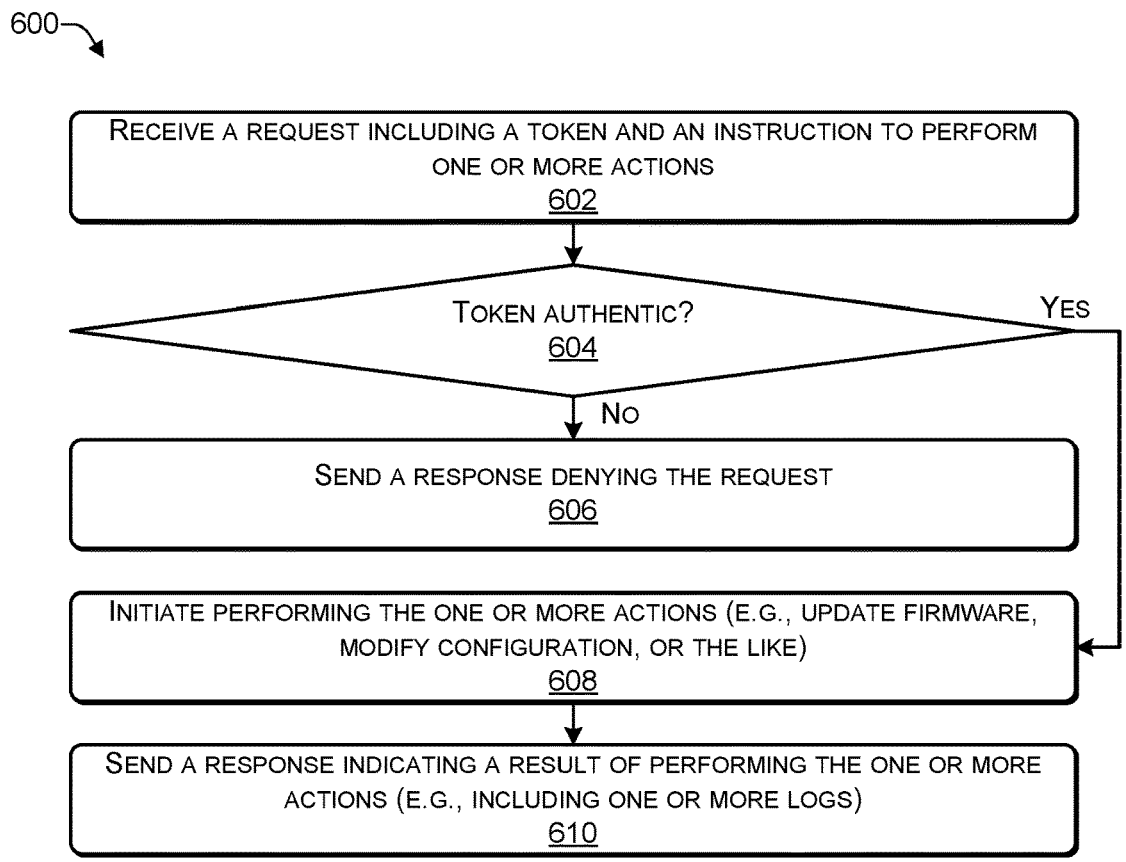
FIG. 6 is a flowchart of a process that includes receiving a request that includes a token and one or more actions to perform, according to some embodiments.

In the flow diagram of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600, are described with reference to FIGS. 1, 2, and 3 as described above, although other models, frameworks, systems and environments may be used to implement these processes.

FIG. 4 is a flowchart of a process 400 that includes receiving a token from a server, according to some embodiments. For example, the process 400 may be performed by the admin computing device 122 of FIGS. 1, 2, and 3.

At 402, a dock request may be sent to one or more docks. At 404, a dock ID may be received from each of the docks. For example, in FIG. 1, the admin computing device 122 may send the dock request 136 requesting a dock ID to one or more of the docks 104. In response, the admin computing device 122 may receive, from the one or more of the docks 104, the dock response 138 that includes the dock ID 140 (e.g., one of the dock IDs 112(1) to 112(N)).

At 406, one or more actions associated with the one or more docks may be determined. At 408, a token request (including credentials, the dock ID(s), and the actions) may be sent to a server. At 410, a response that includes a token may be received from the server. For example, in FIG. 2, the admin computing device 122 may send the token request 206 to the servers 124 requesting one of the tokens 208. The token request 206 may include (1) credentials, such as the admin ID 202, (2) the dock ID( ) 140 identifying one or more of the docks 104, and (3) one or more actions 204 that the dock(s) will be instructed to perform. The servers 124 may authenticate the admin ID 202 (credentials) and use the access control list 128 (or other data structure) to determine if the admin ID 202 is authorized to instruct the one or more docks associated with the dock IDs 140 to perform the one or more actions 204. The servers 124 may deny the request 206 if the servers 124 are unable to authenticate the credentials (e.g., the admin ID 202) or if the access control list 128 (or other data structure) indicates that the admin ID 202 is not authorized to instruct the one or more docks (associated with the dock IDs 140) to perform the one or more actions 204. The servers 124 may provide the token 212 to the admin computing device 122 if the servers 124 successfully authenticate the credentials (e.g., the admin ID 202) and the access control list 128 (or other data structure) indicates that the admin ID 202 is authorized to instruct the one or more docks associated with the dock IDs 140 to perform the one or more actions 204. The token 212 may enable (e.g., authorize) the admin computing device 122 (e.g., the agent 120) to instruct one or more of the docks 104 to perform the one or more actions 204.

At 412, a request (that includes the token, and the actions) may be sent to the one or more docks. At 414, a response (including a result of performing the actions) may be received from each of the one or more docks. For example, in FIG. 3, the dock 104(N) may be one of the docks to receive the request 302 to perform the one or more actions 204, such as modifying a configuration of the ports 114(N) or updating the firmware 118(N). The dock 104(N) may verify (e.g., authenticate) the token 212 included in the request 302 to verify that the request 302 was sent by an authorized agent (e.g., and not sent by a bad actor). In this way, the dock 104(N) verifies the authenticity of the request 302 before performing any of the actions 204 specified in the request 302. If the dock 104(N) is able to verify the token 212, then the dock 104(N) may perform the requested actions 204 and provide the response 304 indicating whether the actions 204 were successfully performed. In some cases, the response 304 may include a log (e.g., error log, installation log, or the like) associated with performing one or more of the actions 204. If the dock 104(N) is unable to verify the token 212, then the dock 104(N) may not perform the requested actions 204. In such cases, the dock 104(N) may not provide the response 304 or may provide the response 304 indicating that the requested actions 204 were not performed because the token 212 could not be verified (e.g., authenticated). In this way, bad actors who do not have a valid token cannot modify the configuration 116(N) of the dock 104(N). For example, without one of the tokens 202, a bad actor cannot instruct the dock 104(N) to replace the firmware 118(N) with malicious firmware. In addition, the use of the tokens 208 enables the docks 104 to be remotely configured over the network 126 by the software agent 120 executing on the admin computing device 122 (e.g., without a user physically connecting to each of the docks 104 using the dock connector 108), thereby enabling remote administration of the multiple docks 104 in a large (e.g., Enterprise) network.

FIG. 5 is a flowchart of a process 500 that includes providing a token after authenticating credentials, according to some embodiments. For example, the process 500 may be performed by the servers 124 of FIGS. 1, 2, and 3.

At 502, a request to provide a token, the request including the requester's credentials (e.g., admin ID), one or more dock IDs, and one or more actions to be performed by one or more docks (associated with the dock IDs), is received, e.g., from an admin computing device.

At 504, the credentials (e.g., associated with an administrator or an agent executing on an admin computing device) may be authenticated.

At 506, a determination is made whether the credentials are authorized to request the dock to perform the one or more actions. If a determination is made, at 506, that the requestor's credentials are not authorized to instruct the one or more docks to perform the one or more actions, then a response denying the request to provide the token may be sent to the requesting device (e.g., the admin computing device). If a determination is made, at 506, that the requestor's credentials are authorized to instruct the one or more docks to perform the one or more actions, then a response that includes a token may be sent to the requesting device (e.g., the admin computing device).

For example, in FIG. 2, the admin computing device 122 may send the token request 206, requesting a token, to the servers 124. The token request 206 may include (1) credentials, such as the admin ID 202, (2) the dock IDs 140 identifying one or more of the docks 104, and (3) one or more actions 204 that the particular dock may be requested to perform. The servers 124 may authenticate the credentials (admin ID 202) and use the access control list 128 (or other data structure) to determine if the admin ID 202 is authorized to instruct the one or more docks (associated with the dock IDs 140) to perform the one or more actions 204. The servers 124 may deny the token request 206 in the response 210 if the servers 124 are unable to authenticate the credentials (e.g., admin ID 202) or if the access control list 128 (or other data structure) indicates that the admin ID 202 is not authorized to instruct the one or more of the docks 104 (associated with the dock ID 140) to perform the one or more actions 204. The servers 124 may provide the token 212 in the response 210 sent to the admin computing device 122 if the servers 124 successfully authenticate the credentials (e.g., admin ID 202) and the access control list 128 (or other data structure) indicates that the admin ID 202 is authorized to instruct the one or more of the docks 104 (associated with the dock IDs) to perform the one or more actions 204. The token 212 may enable (e.g., authorize) the admin computing device 122 to instruct the one or more of the docks 104 to perform the one or more actions 204.

FIG. 6 is a flowchart of a process 600 that includes receiving a request that includes a token and one or more actions to perform, according to some embodiments. For example, the process 600 may be performed by one or more of the docks 104 of FIGS. 1, 2, and 3.

At 602, a request may be received (e.g., from an admin computing device) that includes a token and an instruction to perform one or more actions. At 604, a determination may be made whether the token can be authenticated (e.g., is the sender authorized to make the request to perform the one or more actions). If a determination is made, at 604, that "no" the token is not authentic, the process may send a response denying the request. If a determination is made, at 604, that "yes" the token is authentic, the process may proceed to 608, where the process may begin to perform the one or more actions (e.g., modify the configuration of the dock, modify the firmware of the dock, and the like). At 610, a response may be sent to the sender (e.g., the admin computing device) indicating a result of performing the one or more actions. In some cases, one or more logs (e.g., an error log, a firmware installation log, or the like) may be included in the response.

For example, in FIG. 3, the dock 104(N) (N>0) may receive the request 302 to perform the one or more actions 204, such as modify the configuration 116(N) or modify the firmware 118(N). The dock 104(N) may verify (e.g., authenticate) the token 212 included in the request 302 to verify that the request 302 was sent by an authorized agent (e.g., and not sent by a bad actor). For example, the dock 104(N) may use the validator 110(N) to validate the token 212 or the dock 104(N) may ask the servers 124 to validate the token 212. In this way, the dock 104(N) may verify the authenticity of the request 302 before performing any of the actions 204 specified in the request 302. If the dock 104(N) is able to verify the token 212, then the dock 104(N) may perform the actions 204 and provide the response 304 indicating whether the actions 204 were successfully performed. In some cases, the response 304 may include one or more logs (e.g., an error log, an installation log, or another log) associated with performing the actions 204. If the dock 104(N) is unable to verify the token 212, then the dock 104(N) may not perform the actions 204. In some cases, the dock 104(N) may provide the response 304 indicating that the actions 204 were not performed because the token 212 could not be verified (e.g., authenticated). In this way, bad actors who do not have a valid token cannot modify the dock 104(N) and cannot load malicious firmware onto the dock 104(N). In addition, the dock 104(N) can be remotely configured over the network 126 by the software agent 120 executing on the admin computing device 122, e.g., without a user physically connecting to the dock 104(N) using the dock connector 108(N), thereby enabling remote administration of multiple docks 104 in a large network.

Figure 7:
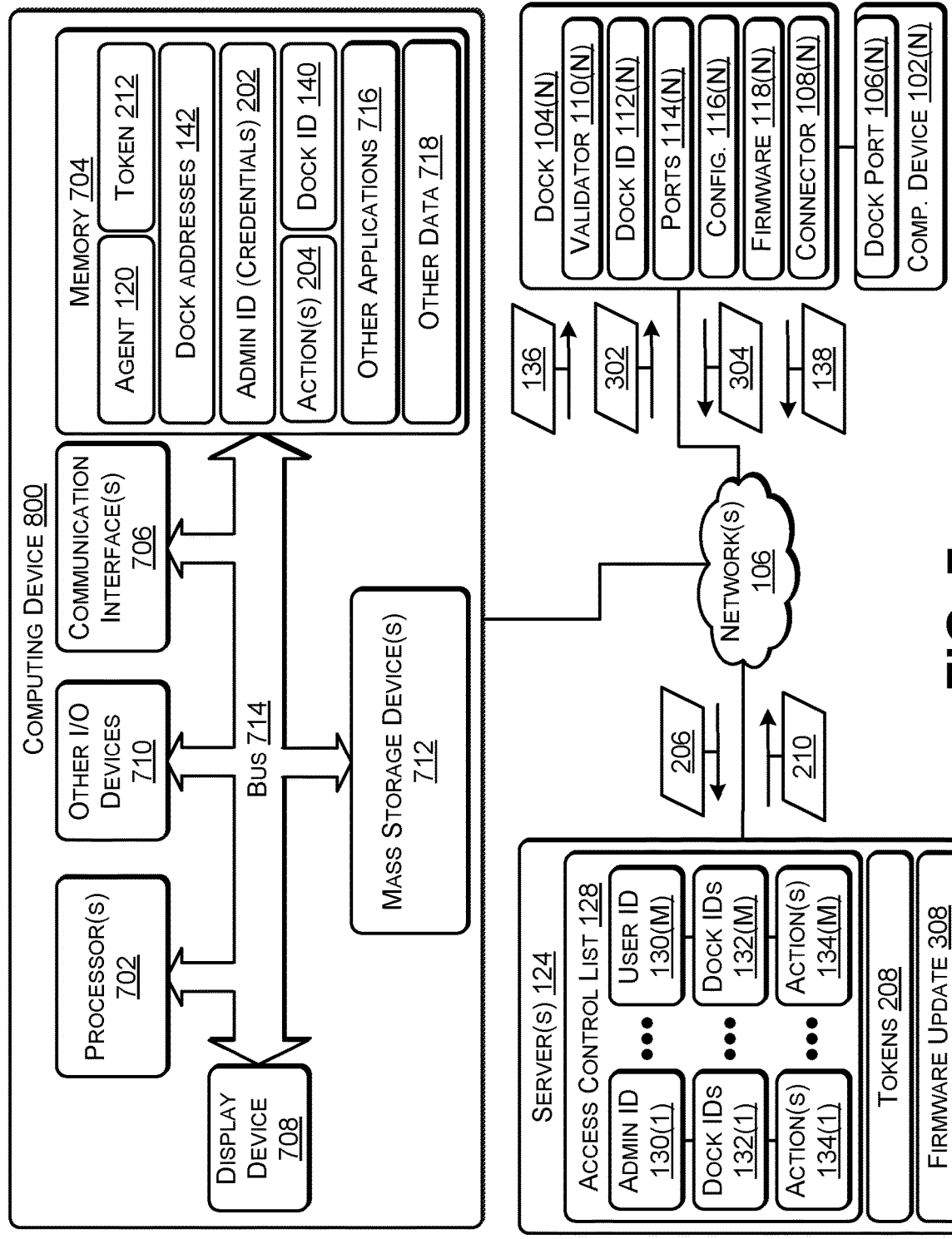
FIG. 7 illustrates an example configuration of a computing device that can be used to implement the systems and techniques described herein.

FIG. 7 illustrates an example configuration of a computing device 800 that can be used to implement the systems and techniques described herein, such as, for example, the admin computing device 122, the servers 124, the docks 104, or the computing devices 102 of FIG. 1. The computing device 102 may include one or more processors 702 (e.g., CPU, GPU, or the like), a memory 704, communication interfaces 706, a display device 708, other input/output (I/O) devices 710 (e.g., keyboard, trackball, and the like), and one or more mass storage devices 712 (e.g., disk drive, solid state disk drive, or the like), configured to communicate with each other, such as via one or more system buses 714 or other suitable connections. While a single system bus 714 is illustrated for ease of understanding, it should be understood that the system buses 714 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 702 are one or more hardware devices that may include a single processing unit or a number of processing units, all of which may include single or multiple computing units or multiple cores. The processors 702 may include a graphics processing unit (GPU) that is integrated into the CPU or the GPU may be a separate processor device from the CPU. The processors 702 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 702 may be configured to fetch and execute computer-readable instructions stored in the memory 704, mass storage devices 712, or other computer-readable media.

Memory 704 and mass storage devices 712 are examples of computer storage media (e.g., memory storage devices) for storing instructions that can be executed by the processors 702 to perform the various functions described herein. For example, memory 704 may include both volatile memory and non-volatile memory (e.g., RAM, ROM, or the like) devices. Further, mass storage devices 712 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein and may be any type of non-transitory media capable of storing computer-readable, processor-executable program instructions as computer program code that can be executed by the processors 702 as a particular machine configured for carrying out the operations and functions described in the implementations herein.

The computing device 700 may include one or more communication interfaces 706 for exchanging data via the network 106. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 706 can also provide communication with external storage, such as a storage array, network attached storage, storage area network, cloud storage, or the like.

In the case where the computing device 800 is used to implement the dock 104(N), the processors 702 may include an embedded controller (e.g., a microcontroller or embedded logic device) and the mass storage device 712 may include firmware (e.g., read only memory (ROM).

The display device 708 may be used for displaying content (e.g., information and images) to users. Other I/O devices 710 may be devices that receive various inputs from a user and provide various outputs to the user, and may include a keyboard, a touchpad, a mouse, a printer, audio input/output devices, and so forth. The computer storage media, such as memory 116 and mass storage devices 712, may be used to store software and data, such as, for example, the agent 120, the dock addresses, the admin ID 202 (or other credentials), the actions 204, the dock ID 140, other applications 716, and other data 718.

Thus, the agent 120 may send the dock request 136 (e.g., requesting a dock ID) to one or more of the docks 104, such as the representative dock 104(N). In response, the agent 120 may receive, from the dock 104(N), the dock response 138 that includes the dock ID 140 (e.g., the dock ID 112(N). The agent 120 may send the token request 206 to the servers 124 requesting one of the tokens 208. The token request 206 may include (1) credentials, such as the admin ID 202, (2) the dock IDs 140 identifying one or more docks, such as the dock 104(N), and (3) one or more actions 204 that each of the docks is to perform. The servers 124 may authenticate the admin ID 202 (credentials) and use the access control list 128 (or other data structure) to determine if the admin ID 202 is authorized to instruct one or more of the docks (e.g., the dock 104(N)) associated with the dock IDs 140 to perform the actions 204. The servers 124 may deny the request 206 if the servers 124 are unable to authenticate the credentials (e.g., the admin ID 202) or if the access control list 128 (or other data structure) indicates that the admin ID 202 is not authorized to instruct the one or more docks (associated with the dock IDs 140) to perform the one or more actions 204. The servers 124 may provide the token 212 to the agent 120 if the servers 124 successfully authenticate the credentials (e.g., the admin ID 202) and the access control list 128 (or other data structure) indicates that the admin ID 202 is authorized to instruct the one or more docks associated with the dock IDs 140 to perform the one or more actions 204. The token 212 may enable (e.g., authorize) the agent 120 to instruct one or more of the docks 104 to perform the one or more actions 204.

The agent 120 may send the request 302 to one or more of the docks, such as the dock 104(N). The one or more docks, such as the dock 104(N), may receive the request 302 to perform the one or more actions 204, such as modifying a configuration of the ports 114(N) or updating the firmware 118(N). Each of the one or more docks, such as the dock 104(N), may verify (e.g., authenticate) the token 212 included in the request 302 to verify that the request 302 was sent by an authorized agent (e.g., and not sent by a bad actor). In this way, each of the docks (e.g., the dock 104(N)) verifies the authenticity of the request 302 before performing the actions 204 specified in the request 302. If each of one or more docks (e.g., the dock 104(N)) is able to verify the token 212 included in the request 302, then each of the one or more docks (e.g., the dock 104(N)) may perform the requested actions 204 and may each provide the response 304 indicating whether the actions 204 were successfully performed. In some cases, the response 304 may include a log (e.g., error log, installation log, or the like) associated with performing one or more of the actions 204. If a particular one of the docks (e.g., the dock 104(N)) is unable to verify the token 212, then the particular dock may not perform the requested actions 204. In such cases, the particular dock may not provide the response 304 or may provide the response 304 indicating that the requested actions 204 were not performed because the token 212 could not be verified (e.g., authenticated). In this way, bad actors who do not have a valid token cannot modify the configuration 116(N) of each of the docks 104. For example, without one of the tokens 202, a bad actor cannot instruct the dock 104(N) to replace the firmware 118(N) with malicious firmware. In addition, the use of the tokens 208 enables multiple ones of the docks 104 to be remotely configured over the network 126, substantially simultaneously, by the software agent 120 executing on the admin computing device 122 (e.g., without a user physically connecting to each of the docks 104 using the dock connector 108), thereby enabling remote administration of the multiple docks 104 in a large (e.g., Enterprise) network.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
sending over a network, by one or more processors and from a computing device, a token request to a server, the token request comprising:
a dock identifier associated with a dock that comprises firmware;
a set of credentials associated with the computing device; and
permission to modify the firmware;
receiving over the network, by the one or more processors, from the server, a token response comprising a token;
sending over the network, by the one or more processors, an action request to the dock of a plurality of docks, the action request comprising the token and an instruction to download and install a new version of the firmware; and receiving from the dock and over the network, by the one or more processors, a dock response indicating the dock downloaded and installed the new version of the firmware.

2. The method of claim 1, further comprising:

sending over the network, from the computing device, a dock identifier request to the dock of the plurality of docks; and receiving, over the network, a dock identifier response from the dock, the dock identifier response comprising a dock identifier associated with the dock.

3. The method of claim 1, further comprising:

sending over the network the action request to a second dock of the plurality of docks; and receiving from the second dock and over the network a second dock response indicating a second result of performing the set of actions.

4. The method of claim 1, wherein the dock validates the token before downloading and installing the new version of the firmware.

5. The method of claim 1, wherein the dock response includes one or more logs generated after downloading and installing the new version of the firmware.

6. The method of claim 1, wherein, before sending the token response, the server:

authenticates the set of credentials associated with the computing device; and determines, using an access control list, that the computing device is authorized to instruct the dock to download and install the new version of the firmware.

7. A computing device comprising:

one or more processors; and one or more non-transitory computer readable media storing instructions executable by the one or more processors to perform operations comprising:

sending, over a network, a token request to a server, the token request comprising:

a dock identifier associated with a dock;

a set of credentials associated with the computing device; and permission to modify firmware of the dock;

receiving, from the server and over the network, a token response comprising a token;

sending, over the network, an action request to the dock of a plurality of docks, the action request comprising the token and an instruction to download and install a new version of the firmware; and receiving over the network, from the particular dock, a dock response indicating the dock downloaded and installed the new version of the firmware.

8. The computing device of claim 7, further comprising:

sending over the network, from the computing device, a dock identifier request to the dock of the plurality of docks; and receiving over the network a dock identifier response from the dock, the dock identifier response comprising a dock identifier associated with the dock.

9. The computing device of claim 7, further comprising:

sending over the network, from the computing device, a dock identifier request to the dock of the plurality of docks; and receiving, over the network, a dock identifier response from the dock, the dock identifier response comprising a dock identifier associated with the dock.

10. The computing device of claim 7, wherein the dock authenticates the token before downloading and installing the new version of the firmware.

11. The computing device of claim 7, wherein the dock response includes one or more logs generated after downloading and installing the new version of the firmware.

12. The computing device of claim 7, wherein, before sending the token response, the server:

authenticates the set of credentials associated with the computing device; and determines, using an access control list, that the set of credentials is authorized to instruct the dock to download and install the new version of the firmware.

13. A dock comprising:

a plurality of ports; and a logic device configured with instructions that are executable by the logic device to perform operations comprising:

receiving in the dock, from a computing device separate from the dock and over a network, an action request comprising:

a token authorizing the computing device to instruct the dock to download and install new firmware on the dock, the token provided to the computing device over the network by a server authenticating credentials associated with the computing device that are received in the server from the computing device over the network together with a dock identifier associated with the dock; and an instruction to download and install firmware;

validating the token; and only if the token is validated, then:

downloading and installing the firmware across the network in response to the instruction to download and install the firmware, and then sending to the computing device, over the network, a dock response indicating the firmware has been downloaded and installed.

14. The dock of claim 13, wherein the dock response includes a log generated after downloading and installing the firmware.

15. The dock of claim 13, wherein validating the token comprises:

executing, by the logic device, validator instructions to validate the token.

16. The dock of claim 13, wherein validating the token comprises:

sending a request to validate the token over a network to a server.

* * * * *